Patented Nov. 14, 1950

2,530,362

UNITED STATES PATENT OFFICE 2,530,362

COAGULATION OF NONELASTIC POLYMERS

Elton K. Morris, Midland, Mich., assignor to The Dow Chemical Company, Midland, Mich., a corporation of Delaware No Drawing. Application November 22, 1946, Serial No. 711,803

3 Claims. (Cl. 18—54)

This invention relates to a method for the coagulation of latices of polymers which are relatively non-elastic, as compared with rubber, and to the improved product thereby obtained.

Many polymeric materials are commonly prepared by emulsifying their corresponding water-insoluble monomers, adding a catalyst to the emulsion, and subjecting the emulsion to a temperature known to induce polymerization of the monomer. The product, comprising a dispersion of fine particles of the polymer in water, resembles rubber latex in its appearance, though it is often characterized by a much higher content of dispersed solids than has such natural latex. Some polymers produced in this manner have many properties resembling those of natural rubber, and these are commonly designated synthetic rubber or rubber-like material. Most polymers, however, do not have rubber-like properties, even though prepared in the form of a latex-like dispersion. Notably, most polymers are readily distinguishable from the rubber-like group of products by virtue of their lack of any great amount of elasticity. Included in this group, by way of example only, are the polymers of vinyl acetate, vinyl chloride, acrylonitrile, styrene, vinylidene chloride, methyl methacrylate, and the like, and their copolymers with some of these or other polymerizable materials containing a single ethylenic unsaturation.

For the purpose merely of separating the disperse phase from the continuous phase in latices of both the rubber-like and the non-rubbery materials, the latex may be mixed with a saline solution, which acts as a coagulant. It is well known that solutions of polyvalent metal salts are usually more effective than those of univalent metal salts in coagulating rubber latex, and the same has been found to hold for latices of non-elastic polymers. A problem exists, however, with the synthetic latices which is either not encountered in natural rubber latex, or is there accepted as unavoidable, namely, that of obtaining a readily washable coagulant, from which the coagulating agent, the emulsifying agent and other impurities, such as catalyst, may readily be removed. In common with rubber and rubber-like materials, the non-elastic polymers tend to coagulate in a non-uniform condition and in one from which emulsifier and other impurities can be washed only with difficulty, if at all, when the latex is simply stirred together with coagulant. Since it is customary to fill the rubber-like material with carbon or other fillers or pigments, it is generally accepted that shaped products therefrom will be at least opaque, and clarity is neither obtained nor excepted in most rubber or rubber-like articles. The relatively non-elastic polymers, however, are expected to produce articles of as great clarity, or ones of as light a color, when obtained from emulsion polymerization processes as they do when produced by the other non-emulsified polymerization procedures. Hence, removal of coagulant, emulsifier and other impurities, in addition to being difficult, is more important in the case of the non-elastic polymers because of their different fields of intended use.

The term "non-elastic polymer" as herein used, is intended to designate the above defined large class of polymeric materials which are unlike rubber in their elastic properties. Thus, while articles of rubber and rubber-like polymers (in the unvulcanized state) may be stretched at least 200 per cent without rupture, and will return nearly instantaneously, upon release, to their former size with at most a 10 to 15 per cent "permanent set," the non-rubbery polymers can seldom be stretched over 25 to 30 per cent, unless heavily plasticized, and either do not return to their former dimension upon release or do so very slowly. When unplasticized, and when normally plasticized with only 5–30 per cent plasticizer, they exhibit at least an 80 per cent permanent elongation (relative to total elongation) when stretched beyond their low elastic limits and then released. They commonly exhibit elasticity only when stretched to 10 per cent or less beyond their original size. It is thus apparent that the disperse phase of non-elastic polymer latices is made up of particles having entirely different behavior characteristics than does the disperse phase in natural and synthetic rubber latices.

It is among the objects of the present invention to provide a method for the coagulation of non-elastic polymers from latices thereof, in a form in which they may be washed readily to remove substantially all of the emulsifier and other impurities, to produce a coagulate capable of being molded or extruded to form shaped articles of improved color or clarity as compared with similar articles produced from coagulates prepared by the bulk mixing of such latex and coagulant. A particular object is to provide such an improved process for the treatment of polystyrene latices to accomplish the indicated improved results. Another object is to provide such an improved process for the treatment of latices of non-elastic copolymers of vinylidene chloride, to accomplish the indicated improved results. Other and related objects may appear as the description proceeds.

It has now been found that the disadvantages of bulk coagulation may be avoided, and that the improved results constituting the foregoing objects may be attained by providing a latex of a polymer which is non-elastic as compared with rubber, which latex is capable of rapid coagulation and settling, feeding the latex through an orifice less than about $\frac{3}{16}$ inch in diameter (preferably less than $\frac{1}{8}$ inch) into a coagulant bath (preferably saline) to coagulate the polymer particles in the form of continuous or discontinuous filaments, and washing the so-formed filaments with fresh water. The coagulation and washing may be carried out at room temperature, but improved results are often obtained when operating at higher temperatures, such as 60° to 90° C. This process gives filaments which, when washed, are substantially free from the coagulant and from the emulsifier and other water-soluble impurities. The product is easily and rapidly dried, for example by a treatment of short duration (5–30 minutes) on a mill at 80° to 150° F., or in a warm air oven. No significant amount of any of the water-soluble impurities is permanently occluded on or otherwise bound in the coagulate. When the so-purified coagulate is molded, after first being broken into particles of suitably short lengths, if necessary, the molded product has a lighter color or, in the case of potentially clear polymers, a greater clarity than have moldings made under the same conditions from the same polymer coagulated in bulk. By way of contrast, the extrusion of rubber and many rubber-like polymer latices through a small orifice, while producing filaments, does not provide the material in a readily washable form. The coagulated rubbery material seems to retain too much of the coagulant and, where present, of the emulsifier. Rubbery filaments, made in this manner, are much slower drying than are the filaments made from non-elastic polymer latices.

The latex employed in the process must be one which is capable of rapid coagulation and settling. Some latices cannot be so coagulated, or the coagulate settles very slowly, due to the extreme fineness of the particles, and such latices are not useful in the present process. An example of such a latex is that of the homopolymer of vinylidene chloride whose coagulate is usually too fine to settle quickly.

Latices of non-elastic polymers may be mixed with emulsions of plasticizers, stabilizers, or other modifiers for the polymer, and the so-modified latex may be extruded through the small orifice into the coagulant bath to produce the readily washable filaments described above, so long as the amount of plasticizer does not render the polymer tacky at ordinary temperatures.

The extrusion into a coagulant of latices of some polymers gives longer, stronger and more flexible filaments than others, but whenever the latex is one of a non-elastic polymer capable of rapid coagulation and settling, the coagulate, whether in long or in short filamentary pieces, is easily washed free from water-soluble impurities.

The following example illustrates the practice of the invention:

*Example*

A number of polymers were prepared by the emulsion polymerization process, and were pumped through small orifices into coagulant baths, after having been filtered to remove any stray lumps. The following table gives pertinent data as to the nature of the polymer, identity of any modifiers in the latex, kind and concentration of the coagulant bath, and characteristics of the filamentary product obtained.

*Table*

| | Latex | | | | Coagulant | | Character of filaments |
|---|---|---|---|---|---|---|---|
| No. | Polymer | Concentration, per cent | Emulsifier | Modifiers, per cent by wt. of polymer | Salt | Concentration per cent | |
| 1 | 80% Vinylidene chloride, 20% Acrylonitrile. | 27.5 | Sulfonated maleic acid esters—5%. | 10% dibutyl phthalate. | $MgCl_2 \cdot 6H_2O$ | 5 | Continuous white fibers. Easily washed, dried and molded. |
| 2 | 40% Vinyl chloride, 60% Vinylidene chloride. | 32 | Sulfonated maleic acid esters—3%. | | do | 5 | Short white filaments. Easily washed, dried and molded. |
| 3 | 15% Vinyl Chloride, 85% Vinylidene chloride. | 20 | do | | $Al_2(SO_4)_3 \cdot 18H_2O$ | 0.5 | 0.5–10 inch white threads. Easily washed, dried and molded. |
| 4 | 100% Polystyrene | 25 | Sulfonated castor oil—4%. | | $MgCl_2 \cdot 6H_2O$ | 5 | Continuous brittle filament. Easily washed, dried, ground and molded. |
| 5 | 85% Vinylidene chloride, 15% Acrylonitrile. | 56 | Methylene bis-napthalene sod. sulfonate—5% | 40% dibutyl phthalate 40% carbon filler. | do | 5 | Short Black filaments. Easily washed, dried and molded. |
| 6 | 70% Vinylidene chloride, 30% Butadiene (for comparison. This is an elastic, somewhat rubbery polymer.) | 23 | Sodium lauryl sulfate—3%. | 10% dibutyl phthalate. | do | 5 | Slimy mass. Hard to filter. Not purified when washed with water. Very slow drying. (Better filaments obtained by coagulation in methanol, but process not practical.) |

In numerous other preparations, latices with a polymer content ranging from 10 per cent to 60 per cent have been extruded, coagulated, washed, dried and molded in accordance with the herein outlined procedure. Spinneret orifices ranging from 0.002 to 0.07 inch diameter have been used satisfactorily, and orifices up to 0.2 inch have been found satisfactory in large equipment, where an adequate supply of fresh coagulant can be provided at all times.

The presence, in the latex, of plasticizers for the polymer in amounts up to about 40 per cent of the weight of polymer, did not adversely affect the ability of the latex to be coagulated as easily washed filaments. In many cases, the larger amounts of plasticizer (over about 10 per cent) converted the latex from one which produced short, discontinuous filaments to one which produced continuous filaments. In most cases the addition of pigments and fillers resulted in somewhat shorter filaments than were obtained without such modifiers, but in all cases where the latex was one of a non-elastic polymer which was capable of being coagulated to give a rapidly settling product, the present process gave a filamentary, readily washed and purified product.

When treating latices which produce continuous filaments, somewhat higher concentrations of saline coagulant are required to give uniform filaments than are necessary merely to coagulate the disperse particles in the usual bulk coagulation process. Thus, with one latex, the relationship can be indicated by the following table:

| Coagulant | Minimum Concentration for Complete Coagulation, Per Cent by Weight | Concentration for Uniform Fiber Coagulation |
|---|---|---|
| $Al_2(SO_4)_3$ | 0.026 | 0.15 |
| $MgCl_2$ | 0.23 | 0.47 |
| $NaCl$ | 2.5 | 10 to 15 |

Similar, readily determinable relations are found for each of the various operative latices. Unless the coagulant is being replenished constantly, it is the usual practice to start with a much higher concentration of coagulant than required, in order to offset the effects of dilution upon addition of the latex.

In addition to the polymers specifically disclosed in the example, the process has been applied successfully to various copolymers of vinyl chloride and vinyl acetate, copolymers of styrene and alpha-methyl styrene, emulsified dispersions of polystyrene mixed with emulsified isopropyl benzene, and the like. Similar results are obtainable with coagulable latices of the esters of acrylic and methacrylic acids.

There may be used, instead of the disclosed circular spinneret orifices, a thin slit orifice of any desired length and of a width from about 0.002 inch or less to about 0.2 inch, to provide a thin continuous film or numerous thin flakes of the coagulated polymer in place of the disclosed filaments. Such alternative products are as easily washed, dried and molded as are the filamentary forms of the same polymers, and for the purposes of this invention they may be deemed equivalent thereto.

As evidence of the improvement in the polymer products, when coagulated as described above, samples of the various filamentary coagulates were molded under standard conditions in comparison with samples of the coagulum obtained by pouring the latex into the coagulant with stirring, followed by repeated washing with water. In each instance, the molding from the filamentary product was of lighter color than that from the bulk coagulum, and, whenever the polymer was one which is normally capable of giving clear moldings, the product of the present process had, when molded, a greater clarity than the molded bulk coagulum. To illustrate, the polystyrene filaments (No. 4 in the table), when broken up and molded at 325° F. and 2,000 pounds pressure per square inch, give moldings whose clarity approaches that of similar moldings made from the conventional mass-polymerized polystyrene and which are much clearer than similar moldings made from material coagulated in bulk from the same latex. Similarly, when the 85–15 vinylidene chloride-vinyl chloride copolymer threads (No. 3 in the table) are molded at 350° F. and 2,000 pounds pressure per square inch, the moldings are translucent and nearly colorless, while similar moldings, made under the same conditions but from material coagulated in bulk from the same latex are nearly opaque and have a distinct yellow-amber tint. These and similar results with other latices indicate the completeness with which emulsifier, catalyst, and coagulant can be washed from the non-elastic polymers made in this manner.

I claim:

1. The method which comprises providing a latex-like dispersion of a copolymer of vinylidene chloride with a compound containing a single ethylenic unsaturation which is non-elastic as compared with rubber, and which settles rapidly when coagulated, feeding a stream of the latex from 0.002 to 0.20 inch in diameter into an excess of a liquid coagulant to form filamentary particles of the polymer which do not permanently occlude water and water-soluble impurities, and washing the particles with fresh water to free them from water-soluble impurities.

2. The method which comprises providing a latex-like dispersion of a copolymer of vinylidene chloride and vinyl chloride which is non-elastic as compared with rubber, and which settles rapidly when coagulated, feeding a stream of the latex from 0.002 to 0.20 inch in diameter into an excess of a liquid coagulant to form filamentary particles of the polymer which do not permanently occlude water and water-soluble impurities, and washing the particles with fresh water to free them from water-soluble impurities.

3. The method which comprises providing a latex-like dispersion of a copolymer of vinylidene chloride and acrylonitrile which is non-elastic as compared with rubber, and which settles rapidly when coagulated, feeding a stream of the latex from 0.002 to 0.20 inch in diameter into an excess of a liquid coagulant to form filamentary particles of the polymer which do not permanently occlude water and water-soluble impurities, and washing the particles with fresh water to free them from water-soluble impurities.

ELTON K. MORRIS.

REFERENCES CITED

The following references are of record in the file of this patent:

UNITED STATES PATENTS

| Number | Name | Date |
|---|---|---|
| 1,947,080 | Gibbons | Feb. 13, 1934 |
| 2,170,441 | Albright | Aug. 22, 1939 |
| 2,227,277 | Shepherd | Dec. 31, 1940 |
| 2,288,982 | Waterman | July 7, 1942 |
| 2,333,634 | Britton | Nov. 9, 1943 |
| 2,348,772 | Wiley | May 16, 1944 |
| 2,354,744 | Dreyfus | Aug. 1, 1944 |
| 2,373,347 | Schoenfeld | Apr. 10, 1945 |
| 2,404,779 | Arnold | July 30, 1946 |